United States Patent
Chang

(10) Patent No.: US 10,001,154 B2
(45) Date of Patent: Jun. 19, 2018

(54) CONNECTING STRUCTURE FOR BARBECUE GRILL

(71) Applicants: REVOACE INC, Taichung (TW); Blue Rhino Global Sourcing, Inc., Winston-Salem, NC (US)

(72) Inventor: Shu-Jui Chang, Taichung (TW)

(73) Assignee: REVOACE INC., Taichung (TW)

( * ) Notice: Subject to any disclaimer, the term of this patent is extended or adjusted under 35 U.S.C. 154(b) by 0 days. days.

(21) Appl. No.: 14/598,223

(22) Filed: Jan. 16, 2015

(65) Prior Publication Data

US 2016/0208837 A1   Jul. 21, 2016

(51) Int. Cl.
*A47J 37/07*   (2006.01)
*F16B 5/02*   (2006.01)

(52) U.S. Cl.
CPC .................. *F16B 5/02* (2013.01); *A47J 37/07* (2013.01)

(58) Field of Classification Search
CPC .... A47J 37/07; A47J 37/0704; A47J 37/0713; A47J 37/0786; A47B 57/50; F16B 12/50
See application file for complete search history.

(56) References Cited

U.S. PATENT DOCUMENTS

| | | | | |
|---|---|---|---|---|
| 3,273,720 A * | 9/1966 | Seiz | ..................... | A47B 57/402 108/107 |
| 4,718,399 A * | 1/1988 | Shepherd | ............ | A47J 37/0786 126/25 R |
| 4,955,743 A * | 9/1990 | King | ....................... | A47B 57/50 211/192 |
| 5,072,718 A * | 12/1991 | Seal | ......................... | F16B 12/50 126/25 R |
| 5,277,106 A * | 1/1994 | Raymer | ............... | A47J 37/0786 108/159 |
| 5,279,214 A * | 1/1994 | Lamendola | ......... | A47J 37/0704 126/25 A |
| 5,452,707 A * | 9/1995 | Harris | ..................... | F16B 12/50 126/25 R |
| 5,623,866 A * | 4/1997 | Home | .................. | A47J 37/0786 126/25 R |
| 5,791,331 A * | 8/1998 | Stewart | ............... | A47J 37/0704 126/25 R |
| 5,941,229 A * | 8/1999 | Schlosser | ............ | A47J 37/0713 126/25 R |
| 6,230,910 B1 * | 5/2001 | Olsson | .................... | A47B 57/50 211/192 |
| 6,257,229 B1 * | 7/2001 | Stewart | ............... | A47J 37/0786 126/276 |

(Continued)

*Primary Examiner* — Daniel Wiley

(57) ABSTRACT

A connecting structure for a barbecue grill contains: a grilling device, a base, and plural coupling assemblies for connecting the base. The base including a first side plate, a second side plate, a bottom plate, a back plate, a front door, and a pull bar. Each coupling assembly includes a holder and a positioning piece, the holder has a joining element, and the joining element has a circular head portion and a circular extension. The positioning piece has a groove with a wide area and a narrow area, and the bottom plate also has an orifice, the second side plate has an aperture to correspond to the orifice. The front door has another aperture formed on a top edge of a right side thereof and has another orifice formed on a bottom edge of the right side thereof, such that two shafts are connected with another aperture and another orifice.

4 Claims, 19 Drawing Sheets

(56) References Cited

U.S. PATENT DOCUMENTS

| | | | | |
|---|---|---|---|---|
| 6,494,419 B2* | 12/2002 | Pai | ............ | A45D 19/04 |
| | | | | 108/132 |
| 6,708,601 B2* | 3/2004 | Home | ............ | A23B 4/052 |
| | | | | 126/25 R |
| 6,925,998 B2* | 8/2005 | Bruno | ............ | A47J 37/0704 |
| | | | | 126/25 R |
| 6,978,722 B2* | 12/2005 | Home | ............ | A47B 13/003 |
| | | | | 108/153.1 |
| 7,810,486 B2* | 10/2010 | Bruno | ............ | A47J 37/0704 |
| | | | | 126/25 R |
| 8,602,017 B2 | 12/2013 | May | | |
| 9,241,566 B1* | 1/2016 | Chen | ............ | A47B 57/38 |
| 2004/0065312 A1* | 4/2004 | Choi | ............ | A47J 37/0786 |
| | | | | 126/25 R |
| 2005/0279341 A1* | 12/2005 | Chung | ............ | A47J 37/0704 |
| | | | | 126/9 R |
| 2007/0169768 A1* | 7/2007 | Chung | ............ | A47J 37/0786 |
| | | | | 126/25 R |
| 2008/0224588 A1* | 9/2008 | Pai | ............ | A47J 37/0786 |
| | | | | 312/410 |
| 2008/0302747 A1* | 12/2008 | Nance | ............ | A47B 57/50 |
| | | | | 211/183 |
| 2014/0053823 A1* | 2/2014 | Frantz | ............ | A47J 37/0763 |
| | | | | 126/276 |

* cited by examiner

CONNECTING STRUCTURE FOR BARBECUE GRILL

FIELD OF THE INVENTION

The present invention relates to a connecting structure for a barbecue grill which connects the barbecue grill quickly and safely.

BACKGROUND OF THE INVENTION

Conventional grill is employed to grill foods, such as meat, vegetables, and fishes, etc.

To barbecue easily and healthily, a barbecue grill is developed and contains a drilling device and a gas supply device below the drilling device.

However, the gas supply device has a large size and is not stored conveniently. Furthermore, it is manually connected and removed by using a hand toll troublesomely.

With reference to FIG. 5, a quick assembly grill and method are disclosed in U.S. Pat. No. 8,602,017 B2. The quick assembly grill contains: a firebox assembly for mounting on a cart assembly, the cart assembly having first and second support assemblies and at least one linking member interconnecting them. A hinge or pivot in the mid-portion of the linking member divides it into first and second linking member portions, and the opposite ends of the linking member portions are pivotally connected by hinges or the like to the first and second support assemblies. The linking member holds the first and second support assemblies together in a partially pre-assembled state, and the pivotal connections of the linking member portions allow the two assemblies to be folded for packaging in a shipping container. When removed from the container, the pivotal connections of the linking member portions allow the first and second support assemblies to be unfolded, with the linking member holding the two support assemblies in approximately the proper position with respect to each other and to the firebox assembly for assembly of the grill.

FIG. 5 illustrates attachment of one of the side tables 12 to the side of the fire box assembly 10. Preferably the firebox base 30 is shipped with threaded fasteners partially threaded into holes for attaching the side tables. The side table includes keyhole openings 70 that are sized and positioned to receive the fasteners. To install the side table, the assembler aligns each keyhole with its respective fastener so that the heads of the fasteners are received through the larger openings of the keyholes. The assembler then slides the side table so that the smaller openings of the keyholes are received underneath the fastener heads and then tightens the fasteners.

Nevertheless, the keyhole 70 matches with fasteners 68 to screw the quick assembly grill. But such a screwing manner is still inconvenient.

The present invention has arisen to mitigate and/or obviate the afore-described disadvantages.

SUMMARY OF THE INVENTION

The primary objective of the present invention is to provide a connecting structure for a barbecue grill which connects the barbecue grill quickly and safely.

To obtain the above objective, a connecting structure for a barbecue grill provided by the present invention contains: a grilling device, a base, and a plurality of coupling assemblies for connecting the base.

The base includes a first side plate, a second side plate, a bottom plate, a back plate, a front door, and a pull bar.

Each coupling assembly includes a holder and a positioning piece, the holder has a joining element, and the joining element has a circular head portion and a circular extension, wherein a diameter of the circular head portion is greater than that of the circular extension, the positioning piece has a groove formed thereon to retain with the joining element of the holder of each coupling assembly, wherein the groove has a wide area and a narrow area communicating with the wide area, and a diameter of the wide area is greater than that of the circular head portion of the joining element, a diameter of the narrow area is within those of the circular head portion and the circular extension.

The first side plate has two holders fixed on a front side and a rear side of an inner wall thereof, and the second side plate has two holders mounted on a front side and a rear side of an inner wall thereof, the pull bar has two positioning pieces fixed on two sides thereof and corresponding to one of the two holders on the front side of the inner wall of the first side plate and one of the two holders on the front side of the inner wall of the second side plate, the back plate has two positioning pieces mounted on two sides thereof and corresponding to the other of the two holders on the rear side of the inner wall of the first side plate and the other of the two holders on the rear side of the inner wall of the second side plate, the bottom plate has four holders fixed adjacent to four corners of a bottom end thereof, the first side plate and the second side plate has four positioning pieces mounted on four bottom ends of two front sides and two rear sides of two inner walls thereof to correspond to the four holders fixed adjacent to the four corners of the bottom end of the bottom plate, and the bottom plate also has an orifice defined adjacent to one of the four corners thereof on a front end of a right side thereof, the second side plate has an aperture defined on a bottom end of the front side of the inner wall thereof to correspond to the orifice adjacent to the one of the four corners on the front end of the right side of the bottom plate, the front door has another aperture formed on a top edge of a right side thereof and has another orifice formed on a bottom edge of the right side thereof, such that two shafts are connected with another aperture and another orifice.

DETAILED DESCRIPTION OF THE PREFERRED EMBODIMENTS

With reference to FIGS. 1 to 10, a connecting structure for a barbecue grill according to a preferred embodiment of the present invention connects the barbecue grill quickly and safely. The connecting structure comprises: a grilling device 1, a base 2, and a plurality of coupling assemblies 3 for connecting the base 2.

Figure 1:
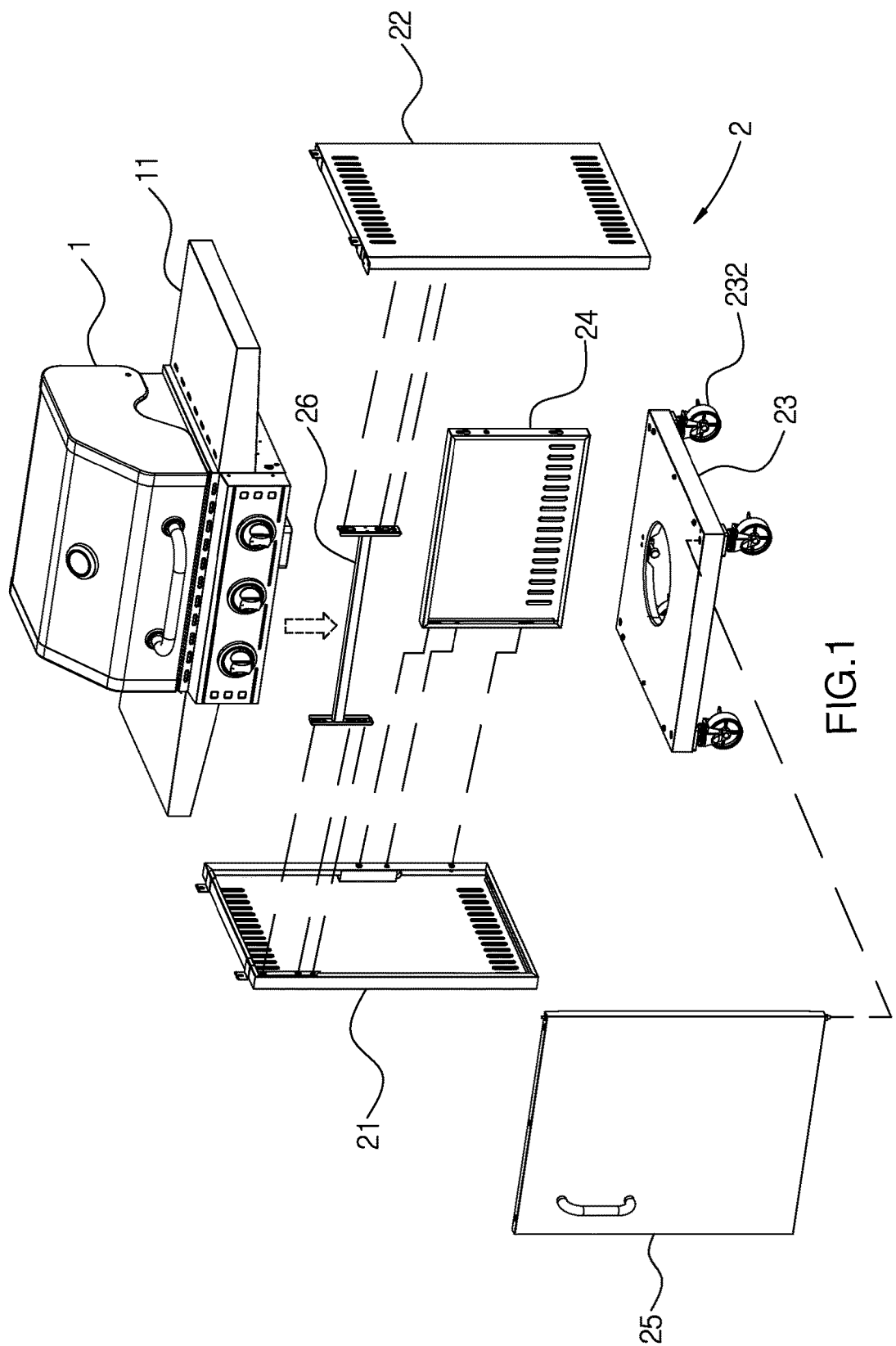
FIG. 1 is a perspective view showing the exploded components of a connecting structure for a barbecue grill according to a preferred embodiment of the present invention.
Figure 2:
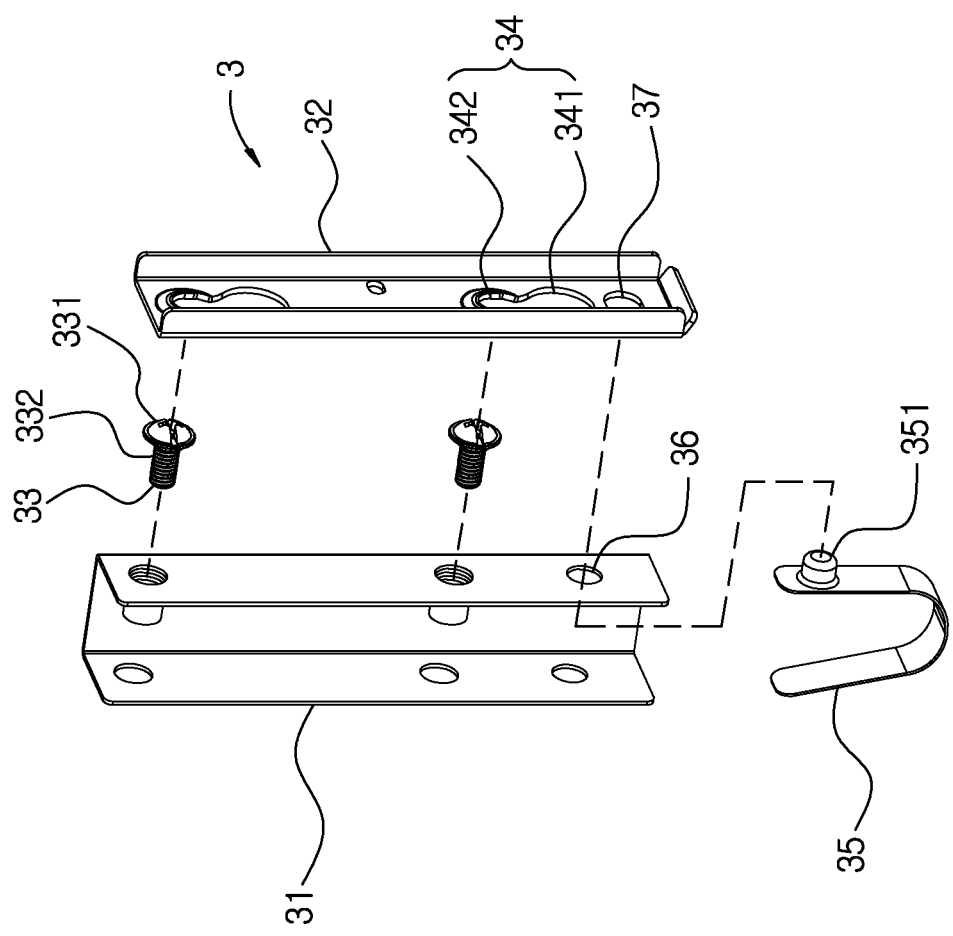
FIG. 2 is a perspective view showing the exploded components of a coupling assembly of the connecting structure for the barbecue grill according to the preferred embodiment of the present invention.
Figure 3:
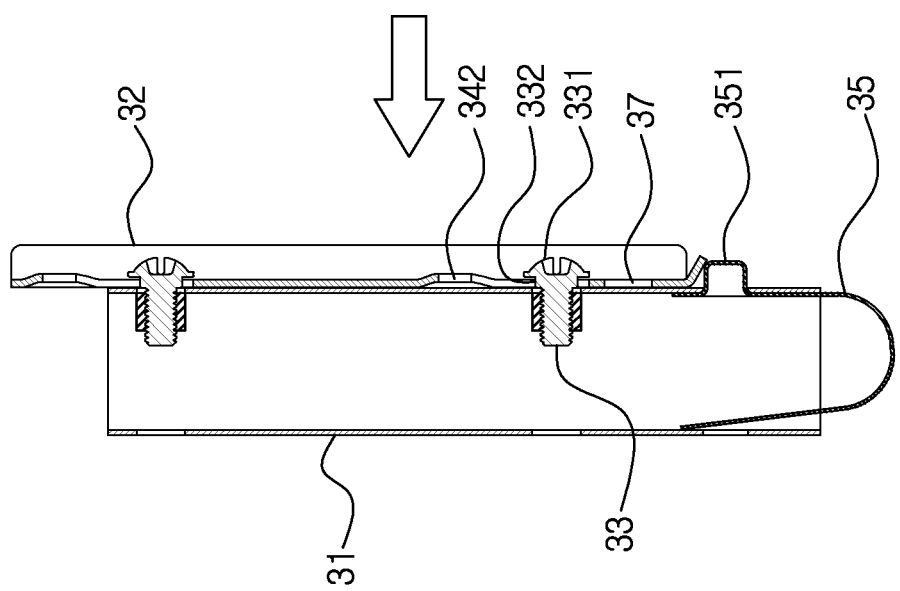
FIG. 3 is a cross sectional view showing the operation of the coupling assembly of the connecting structure for the barbecue grill according to the preferred embodiment of the present invention.
Figure 4:
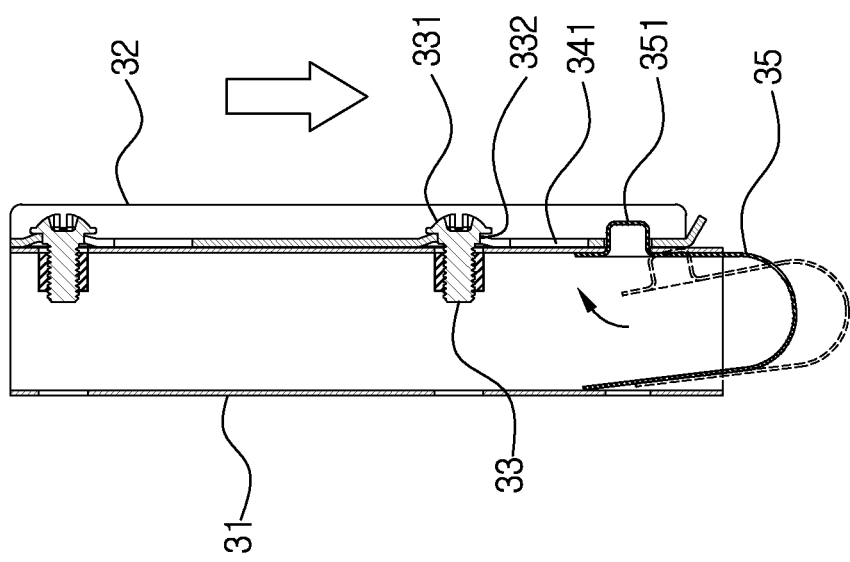
FIG. 4 is another cross sectional view showing the operation of the connecting structure for the barbecue grill according to the preferred embodiment of the present invention.

The base 2 includes a first side plate 21, a second side plate 22, a bottom plate 23, a back plate 24, a front door 25, and a pull bar 26. Each coupling assembly 3 includes a holder 31 and a positioning piece 32, wherein the holder 31 has a joining element 33, and the joining element 33 has a circular head portion 331 and a circular extension 332, wherein a diameter of the circular head portion 331 is greater than that of the circular extension 332. The positioning piece 32 has a groove 34 formed thereon to retain with the joining element 33 of the holder 31 of each coupling assembly 3, wherein the groove 34 has a wide area 341 and a narrow area 342 communicating with the wide area 341, and a diameter of the wide area 341 is greater than that of the circular head portion 331 of the joining element 33, a diameter of the narrow area 342 is within those of the circular head portion 331 and the circular extension 332. Referring to FIGS. 2 to 4, the circular head portion 331 of the joining element 33 is inserted through the wide area 341 of the groove 34, and the circular extension 332 is slid into the narrow area 342 so that the circular head portion 331 retains in the narrow area 342.

Figure 6:
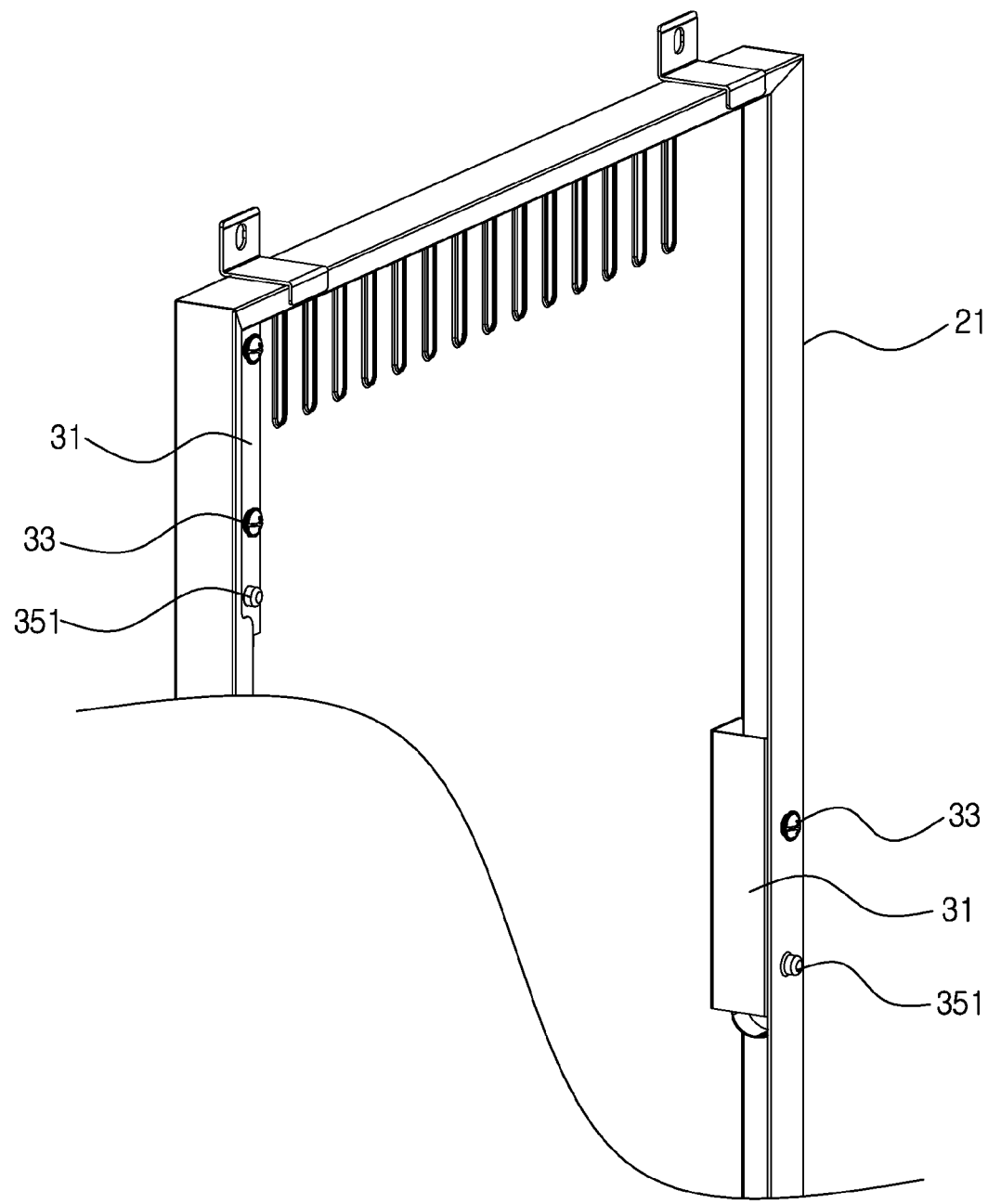
FIG. 6 is a perspective view showing the assembly of a part of a first side plate of the connecting structure for the barbecue grill according to the preferred embodiment of the present invention.

The first side plate 21 has two holders 31 fixed on a front side and a rear side of an inner wall thereof (as shown in FIG. 6), and the second side plate 22 has two holders 31 mounted on a front side and a rear side of an inner wall thereof.

Figure 5:
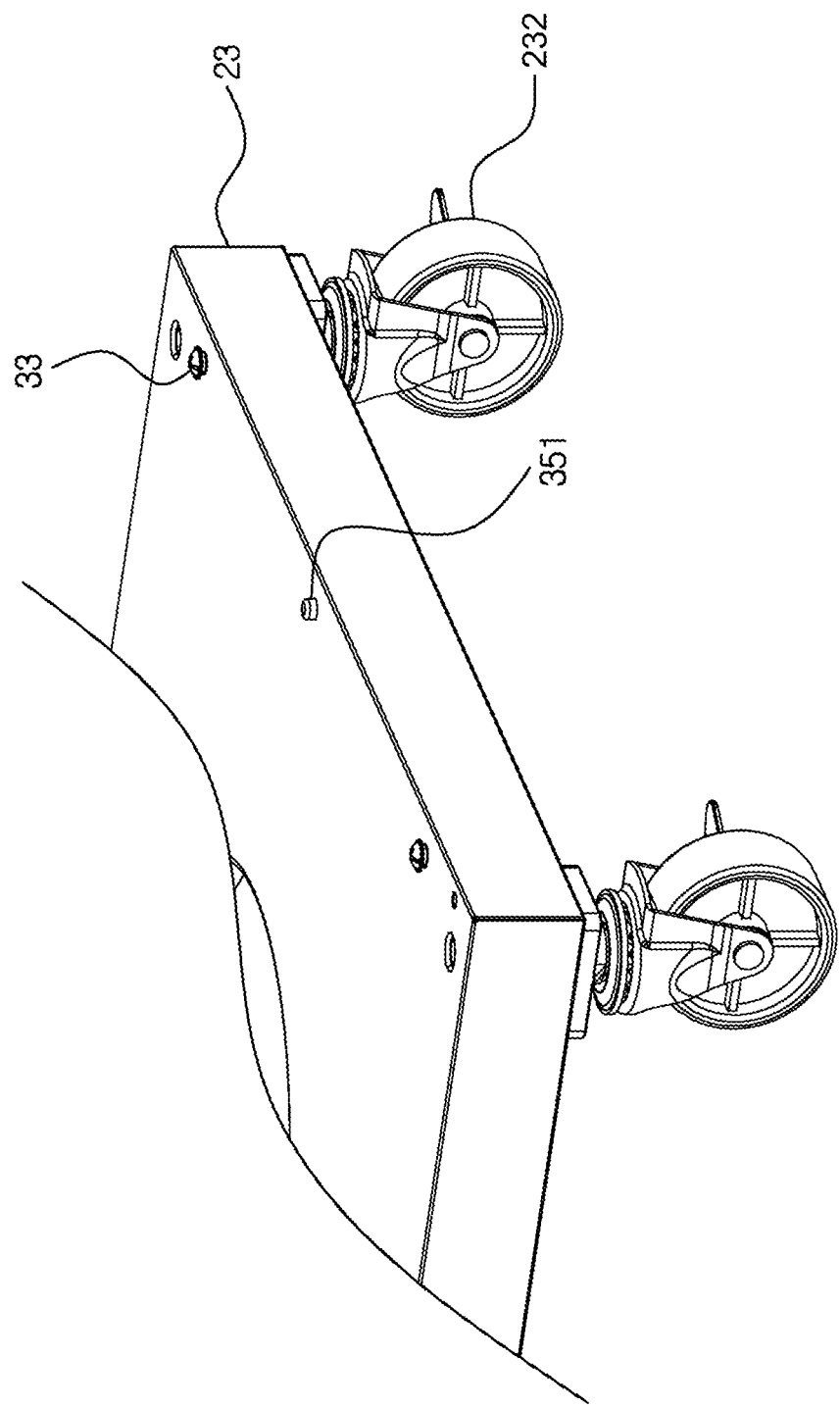
FIG. 5 is a perspective view showing the assembly of a part of a bottom plate of the connecting structure for the barbecue grill according to the preferred embodiment of the present invention.
Figure 7:
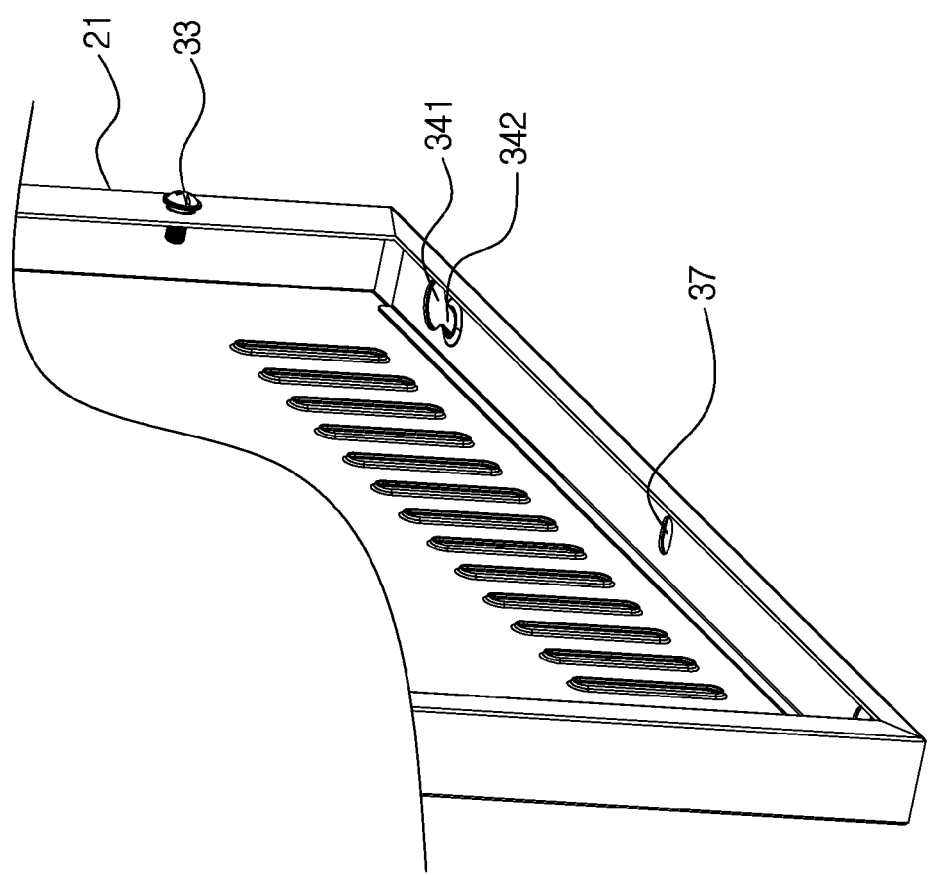
FIG. 7 is another perspective view showing the assembly of a part of a first side plate of the connecting structure for the barbecue grill according to the preferred embodiment of the present invention.
Figure 8:
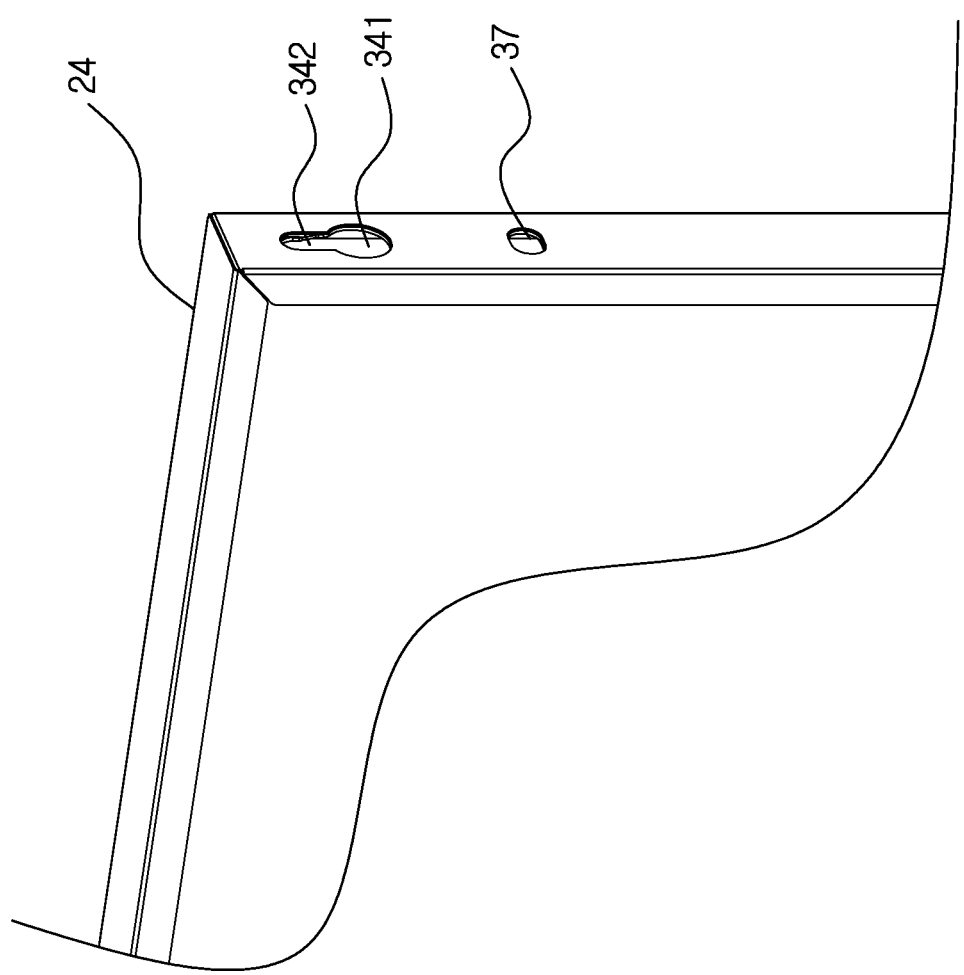
FIG. 8 is a perspective view showing the assembly of a part of a back plate of the connecting structure for the barbecue grill according to the preferred embodiment of the present invention.
Figure 9:
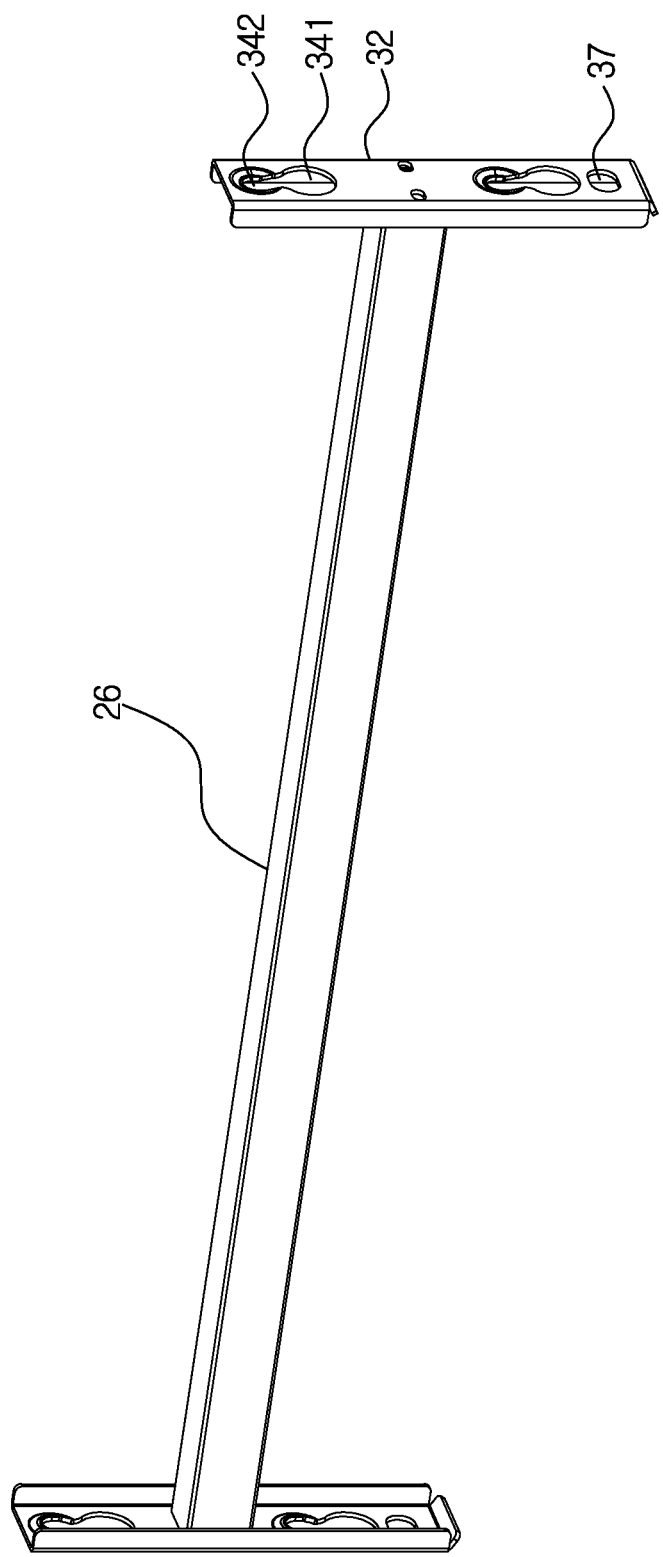
FIG. 9 is a perspective view showing the assembly of a pull bar of the connecting structure for the barbecue grill according to the preferred embodiment of the present invention.
Figure 10:
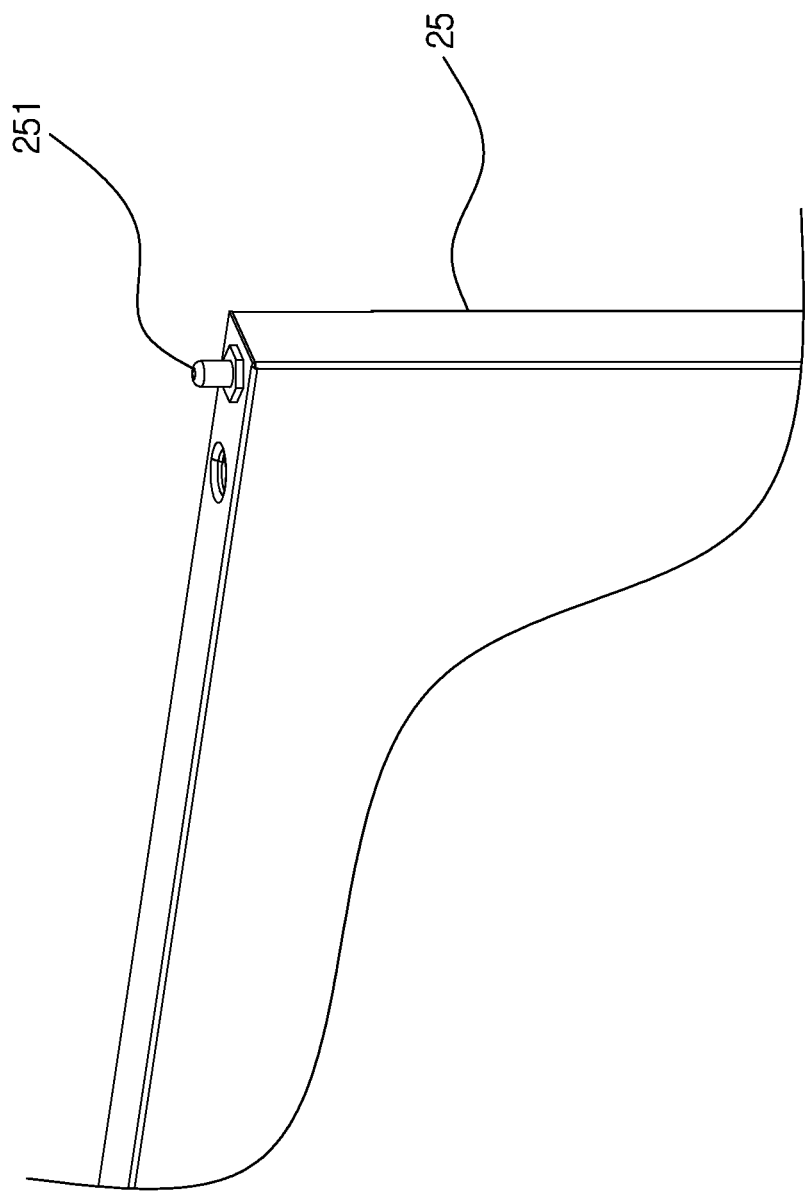
FIG. 10 is a perspective view showing the assembly of a front door of the connecting structure for the barbecue grill according to the preferred embodiment of the present invention.
Figure 11:
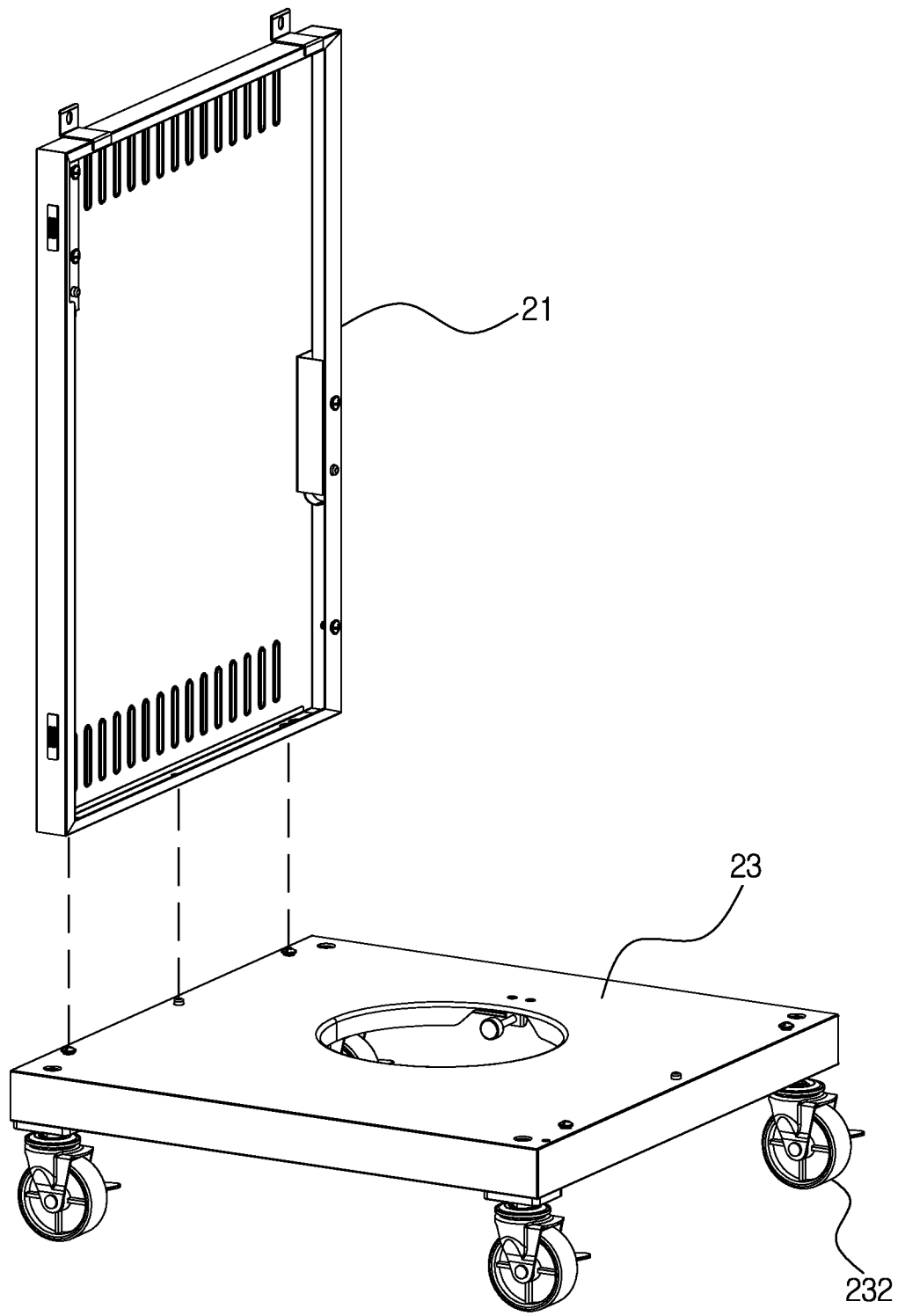
FIGS. 11 to 18 are a perspective view showing a base and the barbecue grill being connected together according to the preferred embodiment of the present invention.
Figure 12:
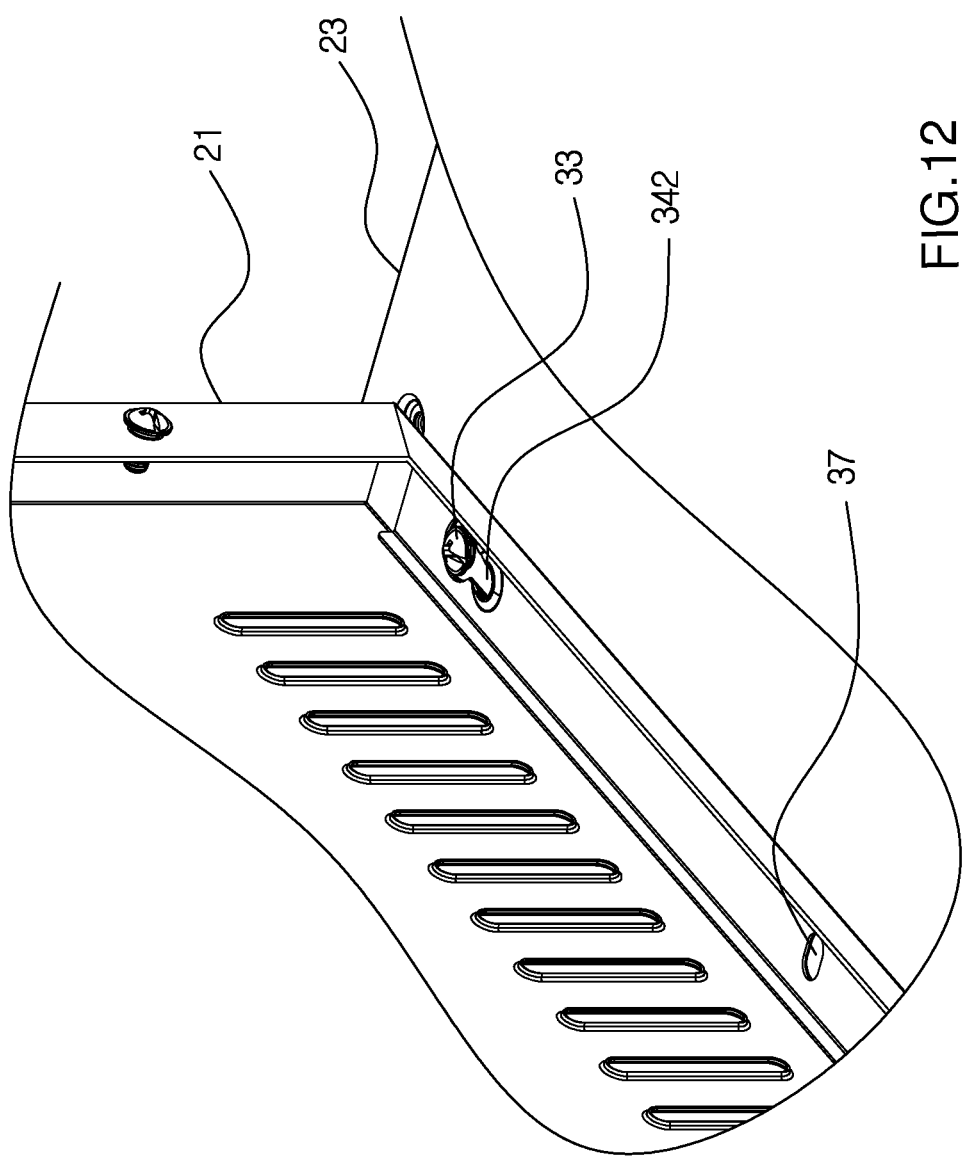
Figure 13:
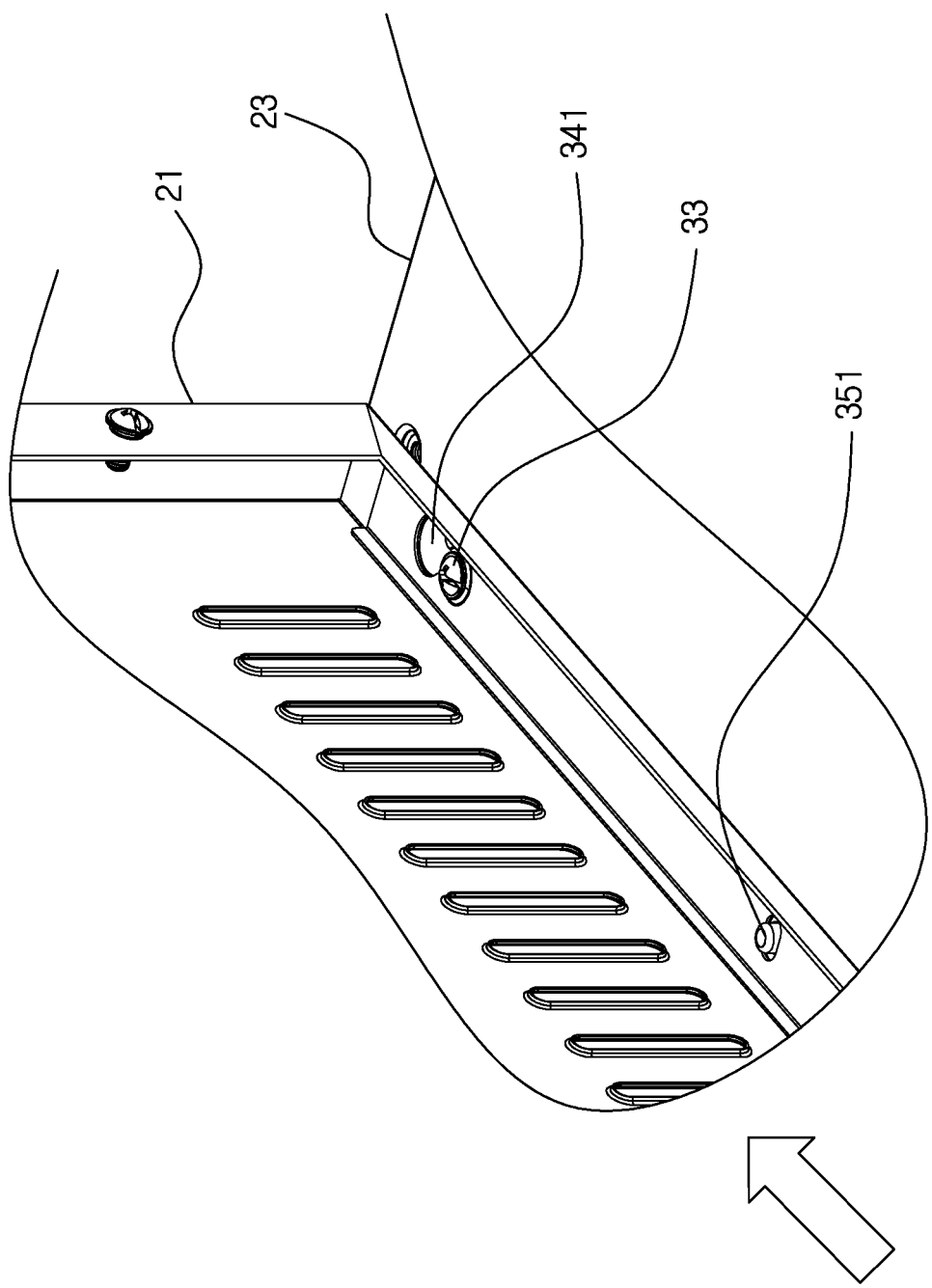
Figure 14:
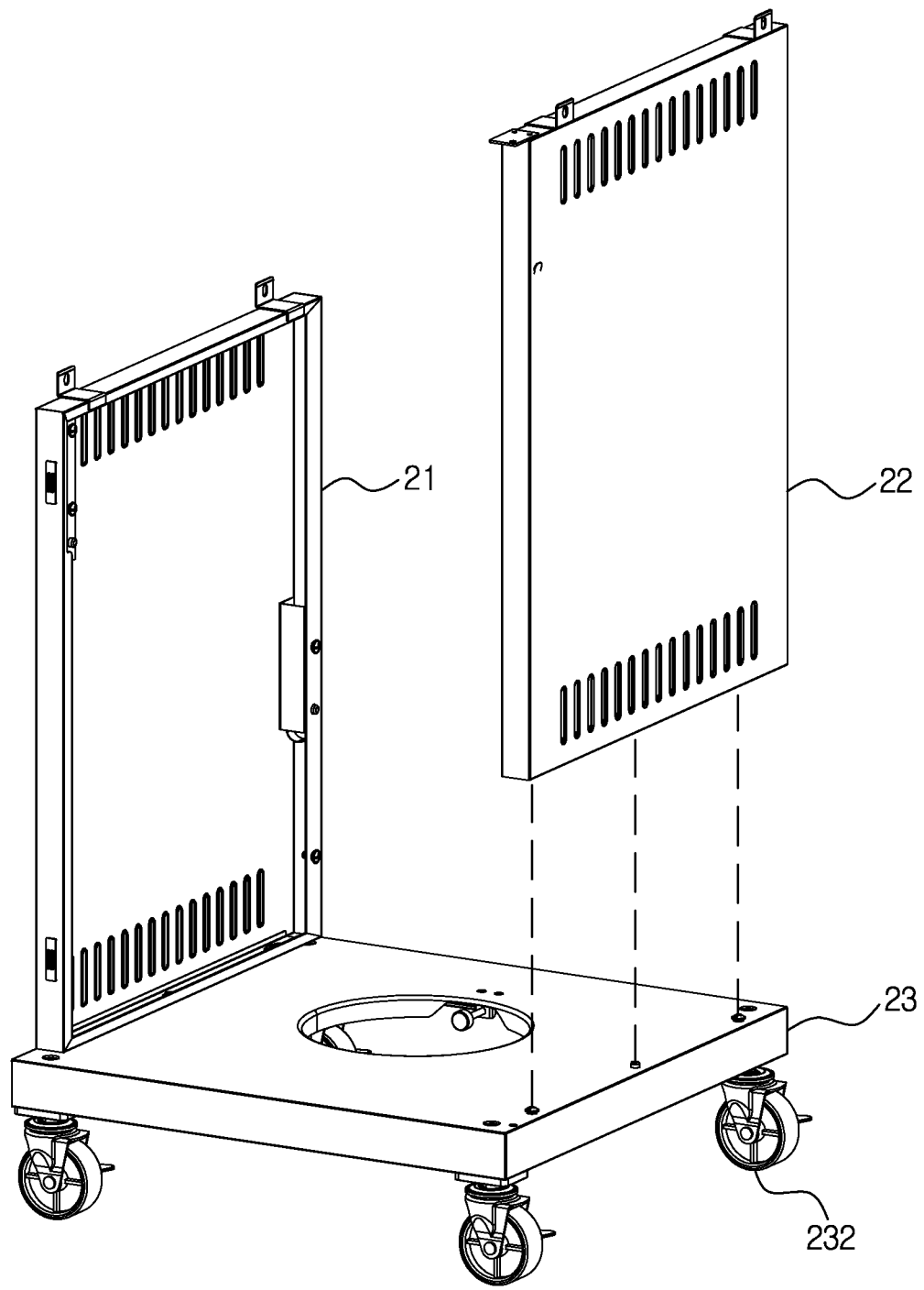

The pull bar 26 has two positioning pieces 32 fixed on two sides thereof (as shown in FIG. 9) and corresponding to one of the two holders 31 on the front side of the inner wall of the first side plate 21 and one of the two holders 31 on the front side of the inner wall of the second side plate 22. The back plate 24 has two positioning pieces 32 mounted on two sides thereof and corresponding to the other of the two holders 31 on the rear side of the inner wall of the first side plate 21 and the other of the two holders 31 on the rear side of the inner wall of the second side plate 22. The bottom plate 23 has four holders 31 fixed adjacent to four corners of a bottom end thereof (as shown in FIG. 5, the four holders 31 has four joining elements 33 exposing outside a top end of the bottom plate 23), the first side plate 21 and the second side plate 22 has four positioning pieces 32 mounted on four bottom ends of two front sides and two rear sides of two inner walls thereof to correspond to the four holders 31 fixed adjacent to the four corners of the bottom end of the bottom plate 23 (as illustrated in FIG. 7), and the bottom plate 23 also has an orifice 231 defined adjacent to one of the four corners thereof on a front end of a right side thereof, and the second side plate 22 has an aperture 221 defined on a bottom end of the front side of the inner wall thereof to correspond to the orifice 231 adjacent to the one of the four corners on the front end of the right side of the bottom plate 23, the front door 25 has another aperture 221 formed on a top edge of a right side thereof and has another orifice 231 formed on a bottom edge of the right side thereof, such that two shafts 251 are connected with another aperture 221 and another orifice 231 (as shown in FIG. 10).

Figure 15:
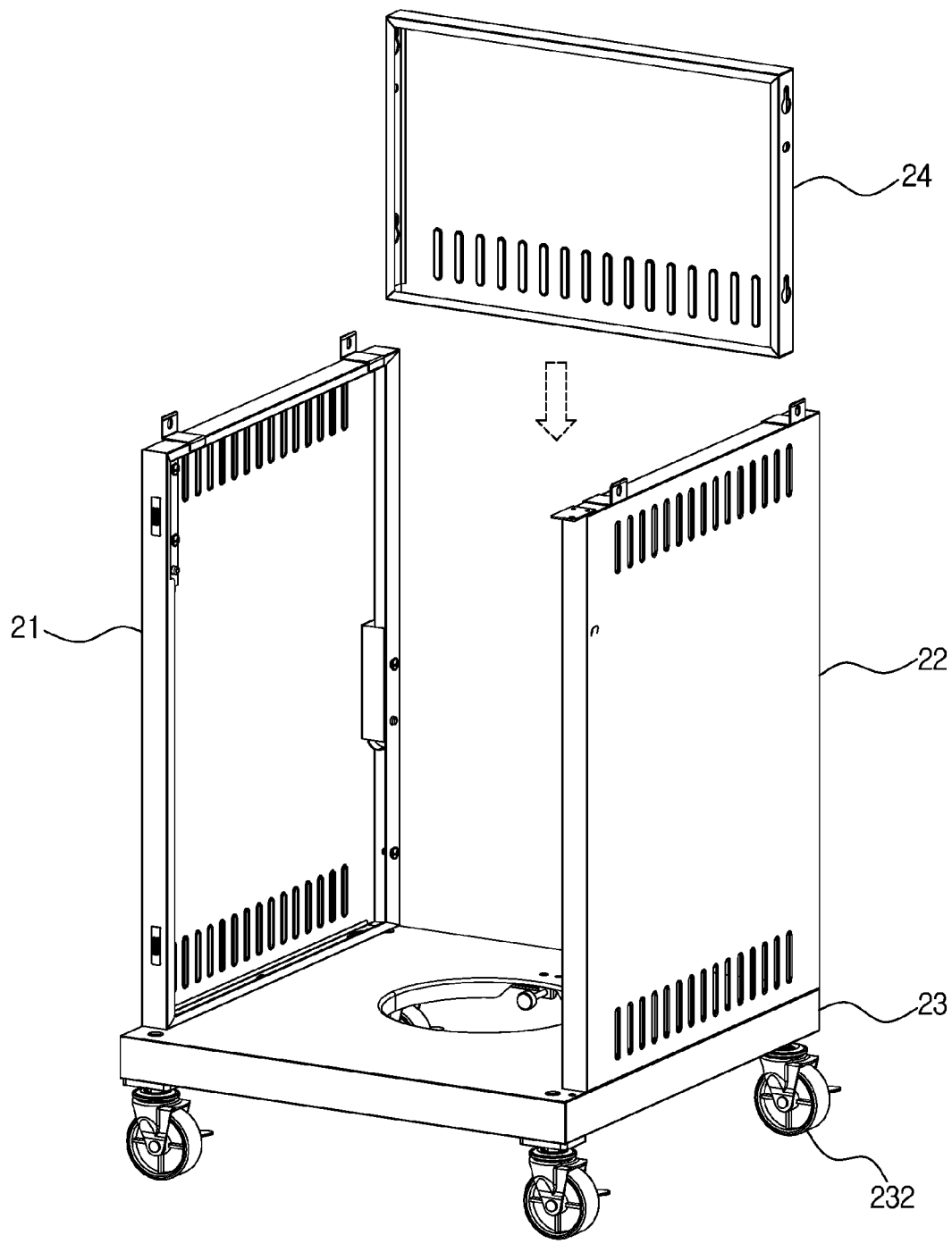
Figure 16:
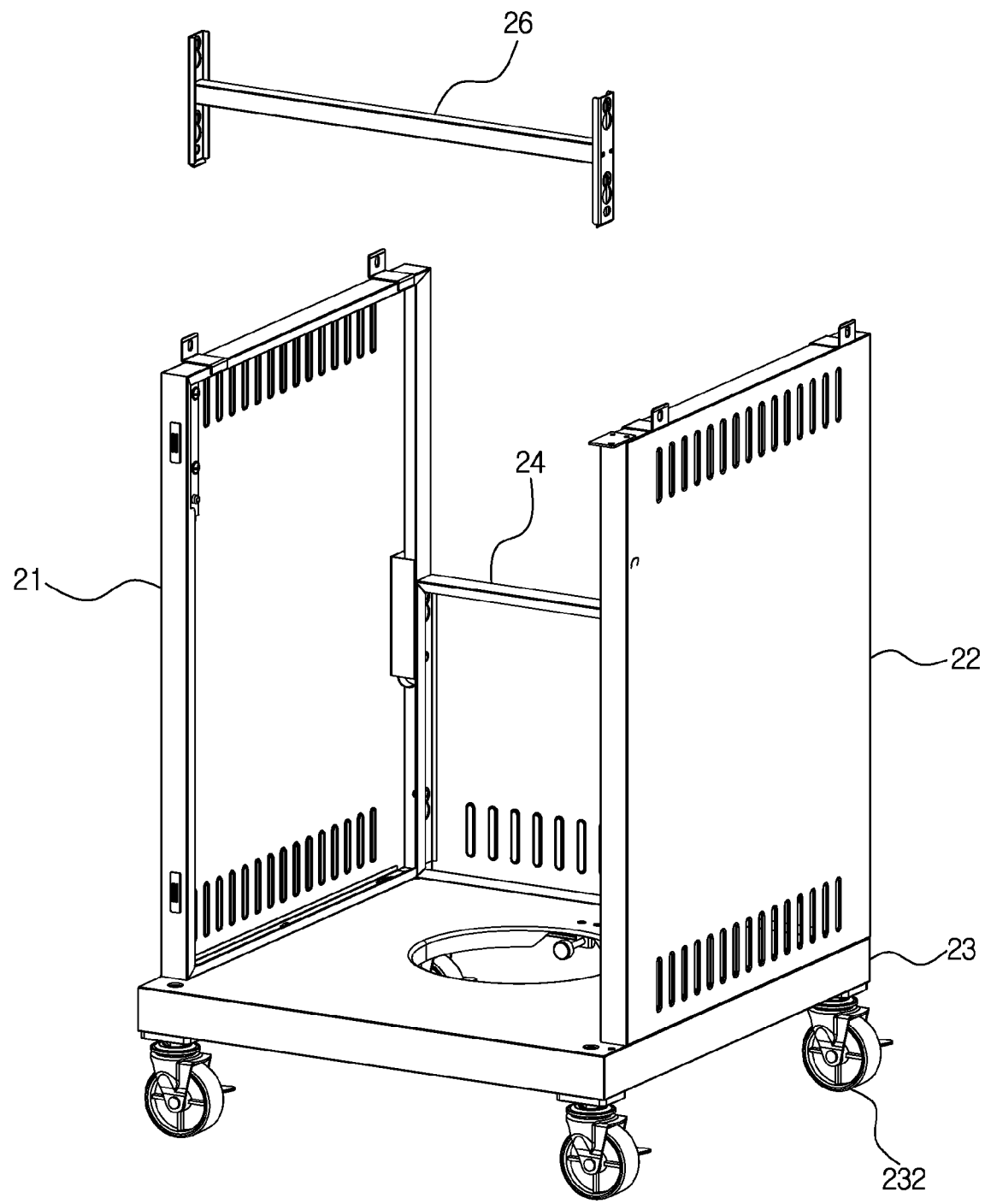
Figure 17:
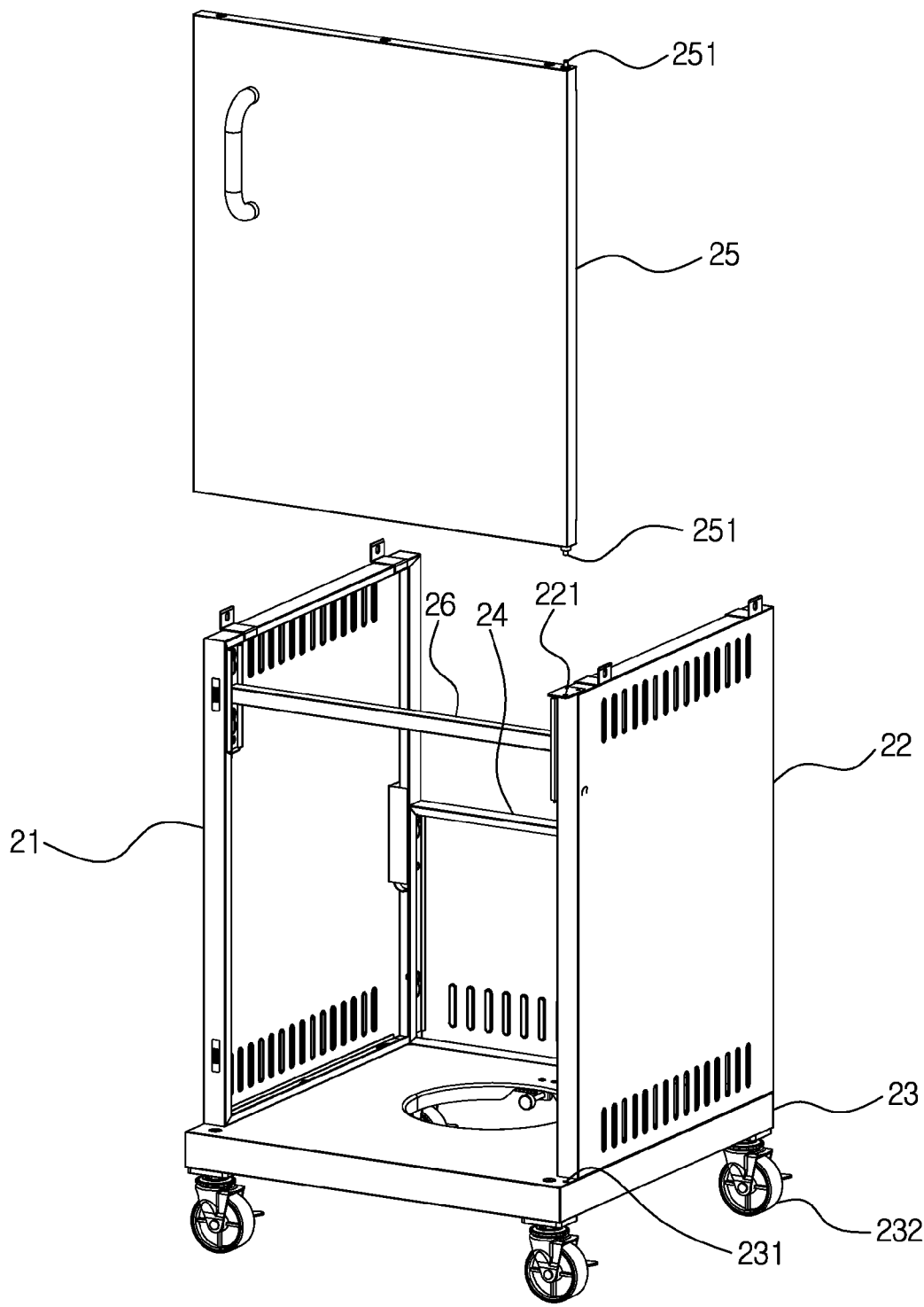
Figure 18:
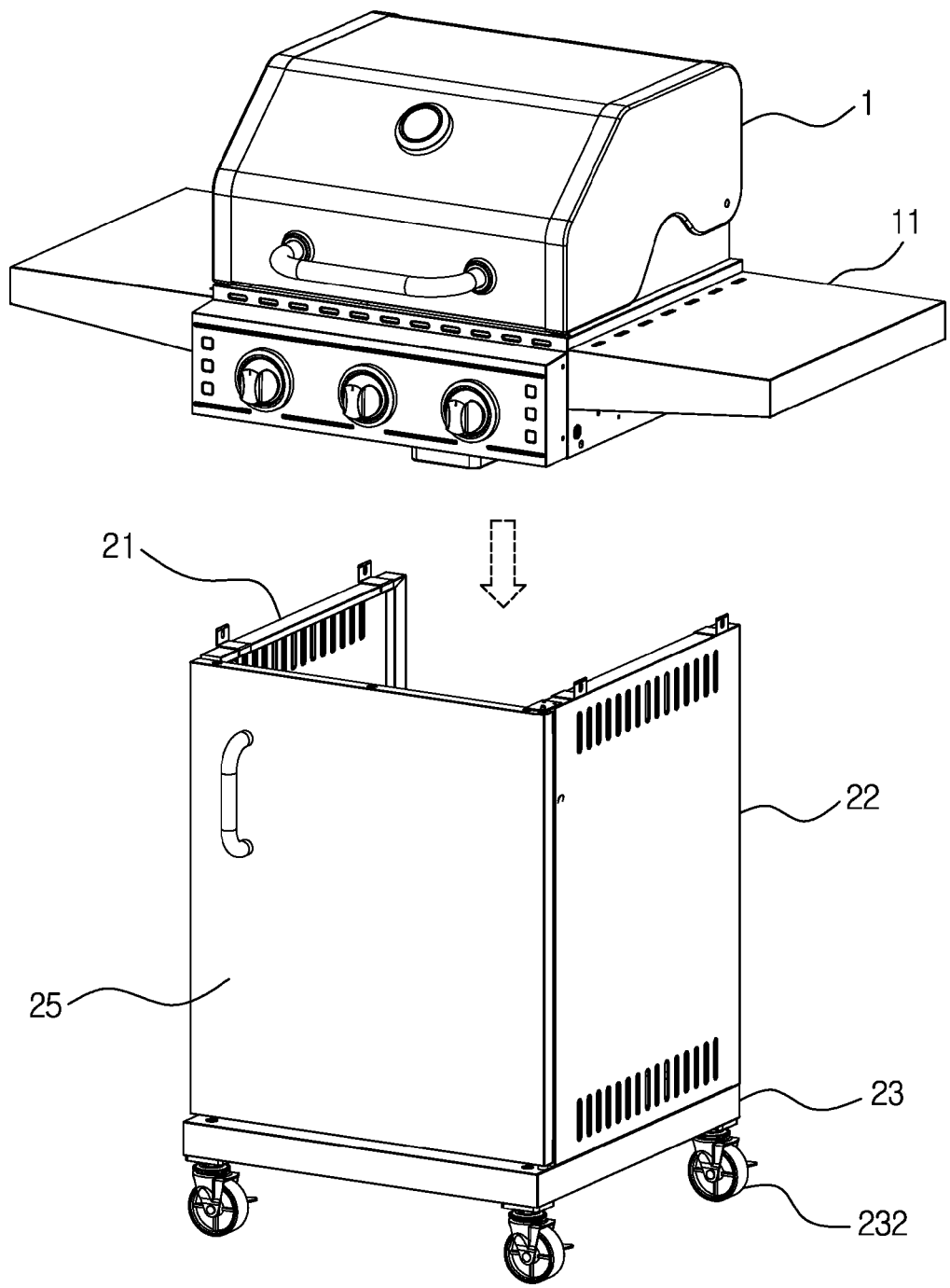
Figure 19:
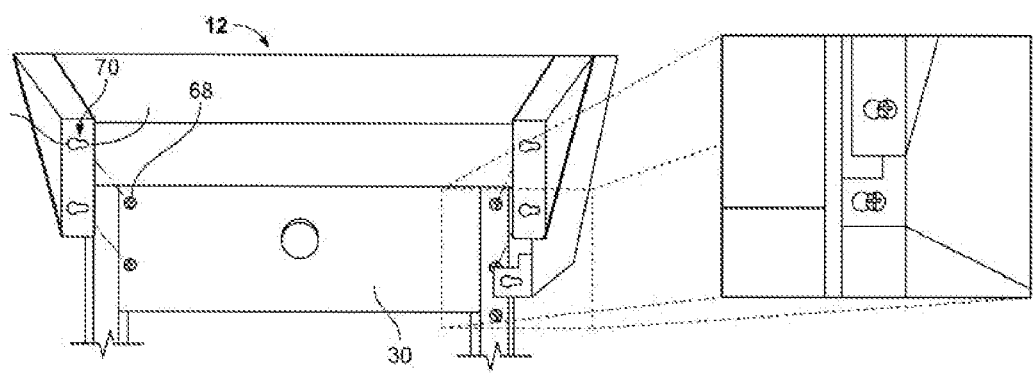
FIG. 19 is a plan view of a conventional quick assembly grill disclosed in U.S. Pat. No. 8,602,017 B2.

In assembly, the first side plate 21 and the second side plate 23 are connected on a left side and the right side of the bottom plate 23 (as shown in FIGS. 11 to 14, wherein the first side plate 21 is connected on the left side of the bottom plate 23 in a slidable retaining manner, and a part of the plurality of coupling assemblies 3 is connected in the slidable retaining manner), the back plate 24 is coupled with the rear side of the inner wall of the first side plate 21 and the rear side of the inner wall of the second side plate 22 (as illustrated in FIG. 15), the pull bar 26 is joined with the front side of the inner wall of the first side plate 21 and the front side of the inner wall of the second side plate 22 (as shown in FIG. 16), and then the two shafts 251 are connected with another aperture 221 of the second side plate 22 and another orifice 231 of the bottom plate 23 (as shown in FIG. 17), thereby assembling the base 2 completely. Thereafter, the grilling device 1 is placed on the base 2, as illustrated in FIG. 18.

Each holder 31 has an elastic piece 35 disposed therein and has a through hole 36 formed thereon, wherein the elastic piece 35 has a peg 351 extending out of the through hole 36, and the positioning piece 32 of each coupling assembly 3 has an opening 37 formed thereon to correspond to the through hole 36. Referring to FIGS. 3 and 4, the peg 351 is inserted into the opening 37 when retaining each holder 31 with each positioning piece 32, thus enhancing connecting strength. In contrast, the peg 351 is pulled out of the opening 37 to remove each holder 31 from each positioning piece 32.

Preferably, the bottom plate 23 further has plural rollers 232 fixed on the bottom end thereof to move the barbecue grill.

The grilling device 1 includes two movable platforms 11 arranged on two sides thereof.

Accordingly, the barbecue grill is fixed by ways of the plurality of coupling assemblies 3 quickly and safely.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A connecting structure for a barbecue grill comprising:
a grilling device, a base, and a plurality of coupling assemblies for connecting the base;
the base including a first side plate, a second side plate, a bottom plate, a back plate, a front door, and a pull bar;
wherein each coupling assembly includes a holder and a positioning piece,
   wherein the holder has a joining element, and the joining element has a circular head portion and a circular extension, wherein a diameter of the circular head portion is greater than that of the circular extension, and
   wherein the positioning piece has a groove formed thereon to retain with the joining element of the holder of each coupling assembly, wherein the groove has a wide area and a narrow area communicating with the wide area, and a diameter of the wide area is greater than that of the circular head portion of the joining element, a diameter of the narrow area is within those of the circular head portion and the circular extension;
the first side plate has two holders fixed on a front side and a rear side of an inner wall thereof, and
the second side plate has two holders mounted on a front side and a rear side of an inner wall thereof,
the pull bar has two positioning pieces fixed on two sides thereof and corresponding to one of the two holders on the front side of the inner wall of the first side plate and one of the two holders on the front side of the inner wall of the second side plate,
the back plate has two positioning pieces mounted on two sides thereof and corresponding to the other of the two holders on the rear side of the inner wall of the first side plate and the other of the two holders on the rear side of the inner wall of the second side plate,
the bottom plate has four holders fixed adjacent to four corners of a bottom end thereof, the first side plate and the second side plate have four positioning pieces mounted on four bottom ends of two front sides and two rear sides of two inner walls thereof to correspond to the four holders fixed adjacent to the four corners of the bottom end of the bottom plate, and the bottom plate also has an orifice defined adjacent to one of the four corners thereof on a front end of a right side thereof, the second side plate has an aperture defined on a bottom end of the front side of the inner wall thereof to correspond to the orifice adjacent to the one of the four corners on the front end of the fight side of the bottom plate, the front door has another aperture formed on a top edge of a right side thereof and has another orifice formed on a bottom edge of the right side thereof, such that two shafts are connected with another aperture and another orifice.

2. The connecting structure for the barbecue grill as claimed in claim 1, wherein each holder has an elastic piece disposed therein and has a through hole formed thereon, wherein the elastic piece has a peg extending out of the through hole, and the positioning piece of each coupling assembly has an opening formed thereon to correspond to the through hole.

3. The connecting structure for the barbecue grill as claimed in claim 1, wherein the bottom plate further has plural rollers fixed on the bottom end thereof.

4. The connecting structure for the barbecue grill as claimed in claim 1, wherein the grilling device includes two movable platforms arranged on two sides thereof.

* * * * *